US012594740B2

(12) United States Patent
Michaud

(10) Patent No.: US 12,594,740 B2
(45) Date of Patent: Apr. 7, 2026

(54) MULTI-LAYERED PRODUCT HAVING AN EMBOSSED INTERIOR LAYER AND A METHOD FOR MAKING THE PRODUCT

(71) Applicant: American Custom Converting, L.L.C., Green Bay, WI (US)

(72) Inventor: Roderick John Michaud, Green Bay, WI (US)

(73) Assignee: American Custom Converting, L.L.C., Green Bay, WI (US)

( * ) Notice: Subject to any disclaimer, the term of this patent is extended or adjusted under 35 U.S.C. 154(b) by 40 days.

(21) Appl. No.: 18/110,251

(22) Filed: Feb. 15, 2023

(65) Prior Publication Data

US 2023/0226795 A1 Jul. 20, 2023

Related U.S. Application Data

(63) Continuation of application No. 17/188,755, filed on Mar. 1, 2021, now Pat. No. 11,584,103.

(Continued)

(51) Int. Cl.
*B31F 1/07* (2006.01)
*B32B 3/28* (2006.01)
(Continued)

(52) U.S. Cl.
CPC .................. *B31F 1/07* (2013.01); *B32B 3/28* (2013.01); *B32B 7/12* (2013.01); *B32B 29/005* (2013.01); *B32B 29/02* (2013.01); *B32B 29/06* (2013.01); *B32B 37/06* (2013.01); *B32B 37/12* (2013.01); *B32B 38/06* (2013.01); *B32B*

*38/164* (2013.01); *D21H 27/32* (2013.01); *B31F 2201/0756* (2013.01); *B31F 2201/0761* (2013.01);
(Continued)

(58) Field of Classification Search
CPC ......... B31F 2201/0787; B32B 2250/03; B32B 7/05; B32B 38/06; B32B 3/28; B32B 3/30
See application file for complete search history.

(56) References Cited

U.S. PATENT DOCUMENTS 3,323,983 A 6/1967 Palmer et al.
3,650,882 A * 3/1972 Thomas ................. A47K 10/16
156/290
(Continued)

FOREIGN PATENT DOCUMENTS

WO 2010021572 2/2010

*Primary Examiner* — Scott W Dodds
(74) *Attorney, Agent, or Firm* — Amundsen Davis, LLC

(57) ABSTRACT

A multi-layered product having an embossed interior layer is disclosed along with a method of making the product. The multi-layered product has a first layer with an interior surface, a second layer with an interior surface, and a third layer sandwiched between the first and second layers. The third layer has a first surface and a second surface and has a thickness therebetween. The third layer is embossed into a waffle pattern having a plurality of protrusions and a plurality of recesses. Each of the plurality of protrusions and recesses is adjacently aligned and horizontally offset from one another. The plurality of protrusions forms a horizontal plane, at the first surface, which is positioned above a horizontal plane formed by the plurality of recesses, at the first surface. The product also has an adhesive which secures the three layers together.

15 Claims, 1 Drawing Sheet

Related U.S. Application Data

(60) Provisional application No. 63/050,923, filed on Jul. 13, 2020.

(51) Int. Cl.

| | |
|---|---|
| *B32B 7/12* | (2006.01) |
| *B32B 29/00* | (2006.01) |
| *B32B 29/02* | (2006.01) |
| *B32B 29/06* | (2006.01) |
| *B32B 37/06* | (2006.01) |
| *B32B 37/12* | (2006.01) |
| *B32B 38/00* | (2006.01) |
| *B32B 38/06* | (2006.01) |
| *D21H 27/32* | (2006.01) |

(52) U.S. Cl.
CPC ... *B32B 2305/20* (2013.01); *B32B 2307/7163* (2013.01); *B32B 2309/105* (2013.01); *B32B 2317/18* (2013.01)

(56) References Cited

U.S. PATENT DOCUMENTS

| | | | |
|---|---|---|---|
| 3,953,638 A | | 4/1976 | Kemp |
| 5,681,422 A | * | 10/1997 | Marschke ............... B31F 1/285 |
| | | | 156/472 |
| 7,785,443 B2 | | 8/2010 | Hermans et al. |
| 7,842,163 B2 | | 11/2010 | Nickel et al. |
| 8,211,815 B2 | | 7/2012 | Baker et al. |
| 8,282,777 B2 | | 10/2012 | Bouplon et al. |
| 8,951,626 B2 | | 2/2015 | Harlacher et al. |
| 2004/0166290 A1 | * | 8/2004 | Sembritzki ............... B31F 1/07 |
| | | | 428/179 |
| 2004/0231559 A1 | | 11/2004 | Bloembergen et al. |
| 2005/0224201 A1 | | 10/2005 | Anderson et al. |
| 2007/0044891 A1 | | 3/2007 | Sellars |
| 2007/0178288 A1 | * | 8/2007 | Andersson ............... B31F 1/07 |
| | | | 428/198 |
| 2016/0129663 A1 | * | 5/2016 | Moss .................... A61F 13/511 |

* cited by examiner

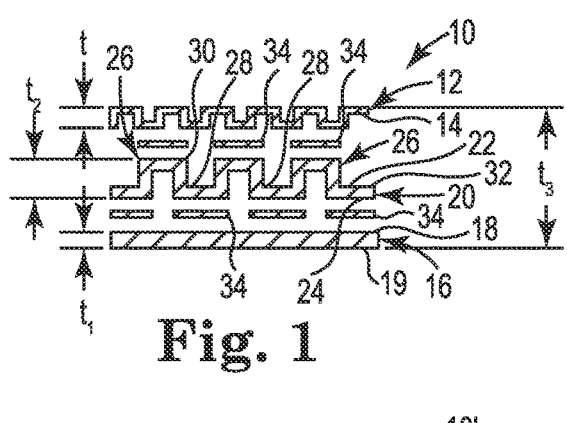
Fig. 1
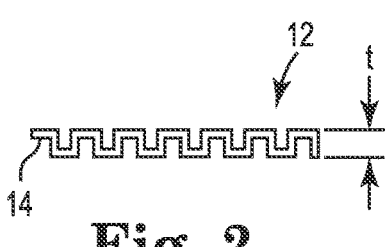
Fig. 2
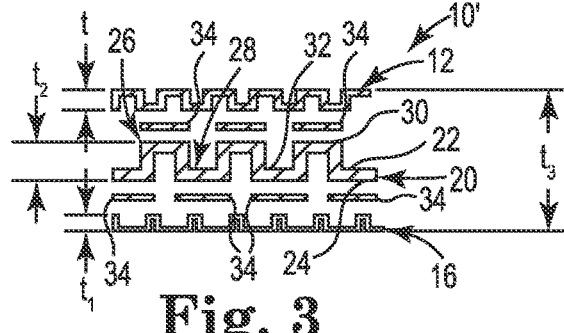
Fig. 3
Fig. 8
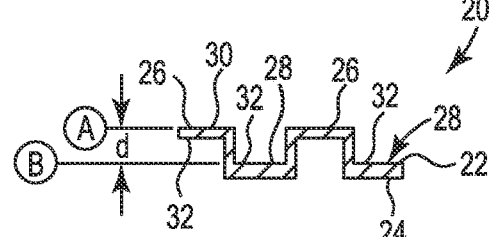
Fig. 4
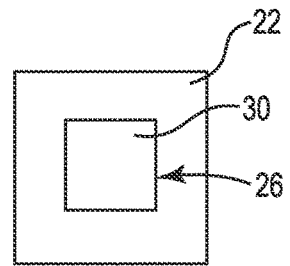
Fig. 9
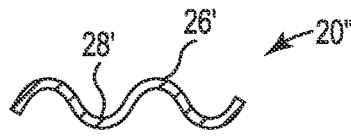
Fig. 5
Fig. 6
Fig. 10
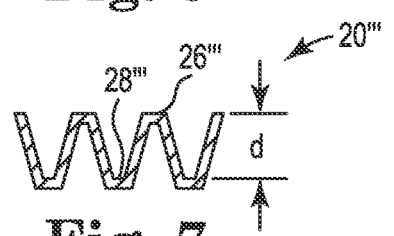
Fig. 7
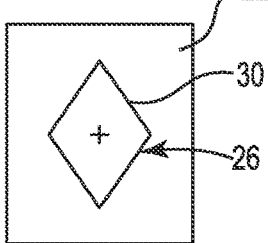
Fig. 11

MULTI-LAYERED PRODUCT HAVING AN EMBOSSED INTERIOR LAYER AND A METHOD FOR MAKING THE PRODUCT

PRIORITY CLAIM

This invention is a divisional application of U.S. patent application Ser. No. 17/188,755, filed on Mar. 1, 2021, which claims priority to Provisional Application 63/050,923, filed Jul. 13, 2020, the contents of each incorporated by reference in their entirely.

FIELD OF THE INVENTION

This invention relates to a multi-layered product having an embossed interior layer and a method for making the product.

BACKGROUND OF THE INVENTION

Multi-layered products, such as various kinds of packages, and absorbent material such as industrial wipes, paper towels, paper napkins, etc. are known in the art. Absorbent paper products having multiple layers have been marketed for many years. Such known industrial wipes, paper towels, paper napkins, etc. vary in basic physical structural characteristics such as layer construction, basis weight, limpness, stretchability, surface texture, softness (hand) and the like. Many such prior art structures, however, lose their strength upon becoming wetted and begin to delaminate and/or disintegrate in use. Increasing the bonding area between the adjacent plies of most current multi-layered structures is undesirable due to the fact that the product becomes stiffer, thereby losing its softness and drape, and, depending upon the particular adhesive employed, may become less absorbent.

Another disadvantage with many of the currently available multi-layered structures is that they tend to lose their bulk upon becoming wetted, thereby, detracting from the product's stability and hand. Loss of these desirable features is deemed to be a strong negative factor by most consumers.

A further drawback is that many multi-layered products are constructed with at least one layer which is not biodegradable and/or compostable. Such products are not totally environmentally friendly and are becoming less acceptable by consumers who are demanding green products. Many consumers are demanding that packages formed from multi-layered material be totally biodegradable.

Now, a multi-layered product having an embossed interior layer has been invented which can retain its bulk and softness even when wetted. This multi-layered product exhibits high strength and superior caliper when both wet and dry and is totally biodegradable and/or compostable. This multi-layered product is especially useful in forming biodegradable packages. A method of making this product is also disclosed.

SUMMARY OF THE INVENTION

Briefly, this invention relates to a multi-layered product having an embossed interior layer which can be used to form various kinds of packages and absorbent products, such as, industrial wipes, paper towels, paper napkins, etc. The multi-layered product includes a first layer having an interior surface and a thickness, a second layer having an interior surface and a thickness, and a third layer sandwiched between the first and second layers. The third layer has a first surface and a second surface, and has a thickness therebetween. The thickness of the third layer is greater than the thickness of either the first layer or the second layer. The third layer is embossed into a waffle pattern having a plurality of protrusions and a plurality of recesses. Each of the plurality of protrusions and each of the plurality of recesses is adjacently aligned and horizontally offset from one another. The plurality of protrusions form a horizontal plane, at the first surface, which is positioned above a horizontal plane formed by the plurality of recesses, at the first surface. The multi-layered product also utilizes an adhesive which secures at least a portion of the interior surfaces of the first and second layers to the first and second surfaces of the third layer.

In a second embodiment, the multi-layered product includes a first layer formed of tissue and embossed with a crepe pattern, and a second layer formed from cellulose and having an interior surface and a planar exterior surface. The second layer has a thickness, and a basis weight ranging from between about 30 to about 60 pounds per ream. The multi-layered product also includes a third layer sandwiched between the first and second layers. The third layer is formed from a tissue or from a non-woven material and has a first surface and a second surface, and has a thickness there between. The thickness of the third layer is greater than the thickness of either the first or second layers. The third layer is embossed into a waffle pattern having a plurality of protrusions and a plurality of recesses. Each of the plurality of protrusions and each of the plurality of recesses is adjacently aligned and horizontally offset from one another. The plurality of protrusions form a horizontal plane, at the first surface, which is positioned above a horizontal plane formed by the plurality of recesses, at the first surface. The multi-layered product also utilizes an adhesive which secures at least a portion of the interior surfaces of the first and second layers to the first and second surfaces of the third layer.

A method of forming the multi-layered product is also taught. The method includes the steps of forming a first layer from tissue and embossing the first layer with a crepe pattern. The first layer has an interior surface and a thickness. Forming a second layer from cellulose. The second layer having an interior surface and a planar exterior surface. The second layer has a thickness. The second layer also has a basis weight ranging from between about 30 to about 60 pounds per ream. The method also includes forming a third layer from a tissue or from a non-woven material. This third layer has a first surface and a second surface, and has a thickness therebetween. The third layer is embossed into a waffle pattern having a plurality of protrusions and a plurality of recesses. Each of the plurality of protrusions and each of the plurality of recesses is adjacently aligned and horizontally offset from one another. The plurality of protrusions form a horizontal plane, at the first surface, which is positioned above a horizontal plane formed by the plurality of recesses, at the first surface. An adhesive is used to secure at least a portion of the interior surfaces of the first and second layers to the first and second surfaces of the third layer. Lastly, the first, second and third layers are routed through a nip to secure the layers together and form the multi-layered product.

The general object of this invention is to provide a multi-layered product having an embossed middle layer. A more specific object of this invention is to provide a multi-layered product which is totally environmentally friendly and which can be used to form various kinds of packages and absorbent products, such as industrial wipes, paper towels, paper napkins, etc.

Another object of this invention is to provide a multi-layered product having a soft exterior surface and having sufficient bulk to resemble a Double Re-Crepe product.

A further object of this invention is to provide a method of making a multi-layered product which is biodegradable and/or compostable.

Still another object of this invention is to provide a multi-layered product wherein one outside layer is formed from cellulose and has a basis weight ranging from between about 30 to about 60 pounds per ream, and which product is easy to manufacture at a reasonable cost.

Still further, an object of this invention is to provide a biodegradable, multi-layered product having a tissue or a non-woven embossed layer sandwiched between a pair exterior layers.

Other objects and advantages of the present invention will become more apparent to those skilled in the art in view of the following description and the accompanying drawings.

BRIEF DESCRIPTION OF THE DRAWINGS

FIG. 1 is an exploded cross-sectional view of a multi-layered product having an embossed waffle pattern on an interior layer.

FIG. 2 is a cross-sectional view of the first layer shown in FIG. 1 and having a crepe embossed pattern.

FIG. 3 is an alternative exploded cross-sectional view of a multi-layered product having a second layer with a planar exterior surface and having an embossed waffle pattern formed on an interior layer.

FIG. 4 is a cross-sectional view of a portion of a square or rectangular shape embossment formed on an interior layer.

FIG. 5 is a cross-sectional view of a portion of a semicircular embossment formed on an interior layer.

FIG. 6 is a cross-sectional view of a portion of a taper embossment formed on an interior layer.

FIG. 7 is a cross-sectional view of a portion of a modified taper embossment formed on an interior layer.

FIG. 8 is a top view of a square shaped embossment.

FIG. 9 is a top view of a circular shaped embossment.

FIG. 10 is a top view of a diamond shaped embossment.

FIG. 11 is a cross-sectional view of a portion of an interior layer having a plurality of protrusions and having at least one aperture formed through each of the protrusions.

DETAILED DESCRIPTION

Referring to FIG. 1, a multi-layered product 10 is shown constructed of three layers. The multi-layered product 10 can contain more than three layers, if desired. The multi-layered product 10 can be used to form various kinds of packages and absorbent products, such as, an industrial wipe, a paper towel, a paper napkin, etc. The multi-layered product 10 includes a first layer 12 having an interior surface 14, a second layer 16 having an interior surface 18, and a third layer 20 sandwiched between the first and second layers, 12 and 16 respectively. The third layer 20 has a first surface 22 and a second surface 24. The first surface 22 faces toward the interior surface 14 of the first layer 12 and the second surface 24 faces toward the interior surface 18 of the second layer 16.

Each of the first, second and third layers, 12, 16 and 20 respectively, can be formed from a tissue. The tissue can be a single ply, two plies or be multiply. It is also possible to form each of the first, second and third layers, 12, 16 and 20 respectively, with a different number of plies. The first layer 12 can be a fibrous web which may be formed from tissue or from a non-woven material. When formed from tissue, the tissue can be formed as a single ply, two plies or be multiply. For example, the tissue can have two, three or four plies. Desirably, the first layer 12 is formed from tissue which has either a single ply or two plies. A "tissue" is defined as a soft absorbent paper having a low basis weight. One generally selects a tissue having a basis weight ranging from between about 8 grams per square meter (gsm) to about 40 gsm. More desirably, the tissue has a basis weight ranging from between about 10 gsm to about 25 gsm. Even more desirably, the tissue has a basis weight ranging from between about 15 gsm to about 25 gsm. The density of the tissue is typically below 0.6 grams per cubic centimeter (g/cm3). Desirably, the tissue has a density of below 0.3 g/cm3. More desirably, the tissue has a density ranging from between about 0.08 g/cm3 to about 0.2 g/cm3.

The production of tissue is distinguished from paper production by its extremely low basis weight and its much higher tensile energy absorption index. Paper and tissue also differ in general with regard to the modulus of elasticity that characterizes the stress-strain properties of these planar products as a material parameter.

A tissue's high tensile energy absorption index results from the outer or inner creping. The tissue is produced by compression of the paper web adhering to a dry cylinder as a result of the action of a crepe doctor, or in the latter instance, as a result of a difference in speed between two wires ("fabrics"). This causes the still moist, plastically deformable paper web to be internally broken up by compression and shearing, thereby rendering it more stretchable under load than an uncreped paper.

Moist tissue paper webs are usually dried using a Yankee dryer, or by Through Air Drying (TAD), or by the impulse drying method.

The fibers contained in the tissue paper are mainly cellulosic fibers, such as pulp fibers from chemical pulp (e.g. Kraft sulfite and sulfate pulps), or mechanical pulp (e.g. ground wood). Thermo-mechanical pulp, chemo-mechanical pulp and/or chemo-thermo mechanical pulp (CTMP) can be used. Pulps derived from both deciduous (hardwood) and coniferous (softwood) can be used. The fibers may also be or include recycled fibers, which may contain any or all of the above categories. The fibers can be treated with additives—such as fillers, softeners, such as quaternary ammonium compounds, and binders, such as conventional dry-strength agents or wet-strength agents used to facilitate the original paper making or to adjust the properties thereof. The tissue paper may also contain other types of fibers, e.g. regenerated cellulosic fibers or annual plant fibers such as sisal, hemp or bamboo fibers, or synthetic fibers which can enhance strength, absorption, smoothness or softness of the paper.

Tissue can also be produced using the Through Air Drying (TAD) technique. This process is characterized by the fact that the "primary" fibrous web that leaves the forming and sheet making stage is pre-dried to a dry-solids content of about 80%. The fibrous web is then dried on the Yankee cylinder by blowing hot air through the fibrous web. The fibrous web is supported by an air-permeable wire or belt or TAD fabric during its transport over the surface of an air-permeable rotating cylinder drum, the so-called TAD cylinder. Structuring the supporting wire or belt makes it possible to produce any pattern of compressed zones broken up by deformation in the moist state, also named moulding, resulting in increased mean specific volumes and consequently leading to an increase of bulk softness without decisively decreasing the strength of the fibrous web.

Referring now to FIG. 2, the first layer 12 is depicted as a tissue layer embossed with a predetermined pattern. The pattern can vary. The pattern can be a crepe pattern, a linen pattern or some other pattern. By "crepe" it is meant a light, soft, thin, non-woven fabric with a crinkled surface. By "linen" it is meant a pattern which resembles a woven linen tablecloth or a linen suit. As stated above, almost any desired pattern can be utilized. The first layer 12 can be a single ply, two plies or be formed of multi-plies, for example, three or more plies.

The first layer 12 has a thickness t. The thickness t can vary. A "mil" is 0.001 inches. Normally, the thickness t of the first layer 12 can range from between about 0.75 mils to about 30 mils. Desirably, the thickness t of the first layer 12 can range from between about 1 mil to about 30 mils. More desirable, the thickness t of the first layer 12 can range from between about 5 mils to about 30 mils. Even more desirably, the thickness t of the first layer 12 can range from between about 10 mils to about 30 mils. Most desirably, the thickness t of the first layer 12 is greater than about 15 mils.

The first layer 12 has a basis weight. By "basis weight" it is meant the weight of a sheet of paper based on standard size. Paper and tissue types are categorized by their base size in the United States. These base sizes are used to calculate a paper's or tissue's basis weight. The basis weight equals the ream (500 sheets) weight of the base size, hence the term basis weight. The basis weight of paper and tissue is calculated by the weight per unit area. Basis weight is primarily expressed in pounds per ream (500 sheets) of a specific size or as grams per square meter (gsm). The basis weight of the first tissue layer 12 can range from between about 3 pounds to about 24 pounds. More desirably, the basis weight of the first tissue layer 12 can range from between about 4 pounds to about 20 pounds. Even more desirably, basis weight of the first tissue layer 12 can range from between about 5 pounds to about 15 pounds. Most desirably, the basis weight of the first tissue layer 12 will depend upon the desired overall basis weight of the finished product 10. For example, if one wanted to make a multi-layered product 10 having a basis weight of about 50 pounds, then the basis weight of the first layer 12 could range from between about 3 pounds to about 24 pounds.

Referring again to FIG. 1, the second layer 16 can vary in composition. The second layer 16 could also be a tissue layer embossed with a predetermined pattern. The pattern can vary. The pattern can be a crepe pattern, a linen pattern or some other pattern. By "crepe" it is meant a light, soft, thin, non-woven fabric with a crinkled surface. By "linen" it is meant a pattern which resembles a woven linen tablecloth or a linen suit. As stated above, almost any desired pattern can be utilized. The second layer 16 can be a single ply, twp plies or be multiply, for example, three or more plies.

The second layer 16 has a thickness t1. The thickness t1 can vary. A "mil" is 0.001 inches. Normally, the thickness t1 of the second layer 16 can range from between about 0.75 mils to about 30 mils. Desirably, the thickness t1 of the second layer 16 can range from between about 1 mil to about 30 mils. More desirable, the thickness t1 of the second layer 16 can range from between about 5 mils to about 30 mils. Even more desirably, the thickness t1 of the second layer 16 can range from between about 10 mils to about 30 mils. Most desirably, the thickness t1 of the second layer 16 is greater than about 15 mils.

The thickness t of the first layer 12 can be greater than, equal to, or be less than the thickness t1 of the second layer 16. Desirably, the thickness t of the first layer 12 is the same as, or equal to, the thickness t1 of the second layer 16 when both the first and second layers, 12 and 16 are formed from tissue and when the multi-layered product 10 is intended to be an absorbent product, such as an industrial wipe, a paper towel, a paper napkin, etc.

The second layer 16 also has a basis weight. The basis weight of the second tissue layer 16 can range from between about 3 pounds to about 24 pounds. More desirably, the basis weight of the second tissue layer 16 can range from between about 4 pounds to about 20 pounds. Even more desirably, basis weight of the second tissue layer 16 can range from between about 5 pounds to about 15 pounds. Most desirably, the basis weight of the second tissue layer 16 will depend upon the desired overall basis weight of the finished product 10. For example, if one wanted to make a product 10 having a basis weight of about 50 pounds, then the basis weight of the second layer 16 could range from between about 3 pounds to about 24 pounds.

The second tissue layer 16 can have a basis weight which is greater than, equal to, or be less than the basis weight of the first tissue layer 12. Desirably, the basis weight of the second tissue layer 16 is the same as, or equal to, the basis weight of the first tissue layer 12 when the multi-layered product 10 is intended to be an absorbent product, such as an industrial wipe, a paper towel, a paper napkin, etc. Alternatively, the basis weight of the second tissue layer 16 can be greater than the basis weight of the first tissue layer 12.

Alternatively, the second layer 16 can be formed from cellulose (paper). By "cellulose" it is meant a complex carbohydrate, $(C_6H_{10}O_5)n$, that is composed of glucose units, which forms the main constituent of the cell wall in most plants, and is important in the manufacture of numerous products, such as paper. The weight of paper is expressed in pounds per ream. The basis weight of a specified area of paper or paperboard is defined as the "basis weight". There are a number of weights and areas used for specifying basis weight. Examples include pounds per 1,000 square feet (lb/1,000 ft2, sometimes referred to as lb/MSF) which is usually used for unbleached boards. Pounds per 3,000 square feet (lb/3,000 ft2, sometimes referred to as lb/3MSF), is the weight of a ream (500 sheets) of paper or paperboard of size 24 inches by 36 inches (2 feet×3 feet). The metric measure of weight, "grammage", is expressed as grams per square meter (g·m2), sometimes referred to as gsm. When the basis weight of a combined board product is reported, the basis weight is that of the entire product, including all components.

The thickness t1 of the second layer 16 can range from between about 5 mils to about 15 mils when the second layer 16 is formed from cellulose, such as Kraft bag stock paper. Desirably, the thickness t1 of the second layer 16 can range from between about 5 mils to about 13 mils when the second layer 16 is formed from cellulose. More desirably, the thickness t1 of the second layer 16 can range from between about 5 mils to about 11 mils when the second layer 16 is formed from cellulose.

When the multi-layered product 10 is used to form a package or envelope, the second layer 16 is usually formed from cellulose (paper). The second layer 16 has an exterior surface 19. The exterior surface 19 is planar. By "planar" it is meant of, relating to, or situated in a plane; flat. A planar exterior surface 19 allows the second layer 16 to be printed or have a label attached to it.

When the second layer 16 is formed from cellulose (paper) it can vary in basis weight. Typically, the weight of paper envelop stock or the weight of the outer layer of a package normally has a basis weight which ranges from between about 30 to about 60 pounds per ream. A basis weight of about 40 pounds per ream or greater can be used to construct the second layer 16 when the mulita-layered product 10 is to be used to form a package or envelope.

The second layer 16 could also be formed from a non-woven. Various types and kinds of non-woven materials are explained below. Furthermore, the second layer 16 could be formed from other materials known to those skilled in the art.

It should be understood that when the second layer 16 is formed from cellulose (paper) and the multi-layered product 10 is intended to be used to form a package or envelope, the thickness t1 of the second layer 16 should be greater than the thickness t of the first layer 12. Desirably, the thickness t1 of the second layer 16 is at least twice the thickness t of the first layer 12.

Referring again to FIG. 1, the multi-layered product 10 also includes a third layer 20. The third layer 20 has a first surface 22 and a second surface 24, and has a thickness t2 therebetween. The thickness t2 of the third layer 20 can vary depending on the overall thickness one desires to obtain in the finished, multi-layered product 10. A "mil" is 0.001 inches. Normally, the thickness t2 of the third layer 20 can range from between about 0.75 mils to about 35 mils. Desirably, the thickness t2 of the third layer 20 can range from between about 1 mil to about 30 mils. More desirable, the thickness t2 of the third layer 20 can range from between about 20 mils to about 30 mils. Even more desirably, the thickness t2 of the third layer 20 can range from between about 23 mils to about 28 mils. Most desirably, the thickness t2 of the third layer 20 is greater than about 26 mils.

It should be understood that in the marketplace, a thick absorbent product is perceived as generally being softer and heavier than a thinner absorbent product, and therefore more desirable. This is especially true when the product is an industrial wiper, a paper towel or a paper napkin. Therefore, a manufacturer who can make a thicker absorbent product from a lighter basis weight material will have success in the marketplace. In order to increase thickness of a product, one or more of the three layers needs to be embossed. Desirably, two or more of the three layers 12, 16 and 20 will be embossed.

The thickness t2 of the third layer 20 can be less than, equal to, or be greater than the thickness of either the first layer 12 or the second layer 16. Normally, the thickness t2 of the third layer 20 is greater than the thickness of either the first layer 12 or the second layer 16. Desirably, the thickness t2 of the third layer 20 is greater than the thickness of both the first layer 12 and the second layer 16. If desired, the thickness t2 of the third layer 20 can be much greater than the thickness t of the first layer 12 and the thickness t1 of the second layer 16.

The third layer 20 can be formed from a variety of material known to those skilled in the art. The third layer 20 can be formed from a non-woven material. Alternatively, the third layer 20 could be formed from: tissue, paper, corrugated paper, foam, a biodegradable plastic, a bioplastic, a compostable plastic, from a combination or two or more materials, or from other materials known to those skilled in the art. A wide range of materials fall under the umbrella of bioplastics, which are commonly defined as "biobased, biodegradable, or both. It might surprise some to know that a bioplastic can be non-biodegradable or contain no biobased materials. It can even be 100% fossil-based. To complicate matters, a bioplastic can be any combination of being partially bio-based, fully bio-based, non-bio-based, biodegradable, compostable or non-biodegradable, so long as it is not both non-bio-based and non-biodegradable.

A conventional plastic is defined as plastic that is fossil fuel-based and non-biodegradable. It takes centuries for most of these plastics to breakdown in the environment, and oil-derived plastics leave toxic byproducts in the soil or water. But if a plastic is biobased and biodegradable or biobased and non-biodegradable, it can be classed as a bioplastic.

Bioplastics are commonly made of corn starch, cassava, or sugarcane. They provide an alternative to petroleum-based plastic and decompose faster and with fewer leftover toxins. But the idea that these plant-based plastics are natural carries with it big misconceptions. These plant-based plastics' biomass content releases methane as it decomposes and they act like conventional plastics in the ocean, degrading into micro-plastics and harming marine life that mistakes it for food.

By "bioplastic" it is meant a moldable plastic material made up of chemical compounds that are derived from or synthesized by microbes such as bacteria or by genetically modified plants. The Plastic Industry Association states that: "bioplastics are plastics that either: originate from a renewable resource, are biodegradable, or are both". A bioplastic is a plastic that is made partly or wholly from polymers derived from biological sources such as sugarcane, potato starch or the cellulose from trees and straws. Some bioplastics degrade in the open air while others are made so that they compost in an industrial composting plant, aided by high temperatures.

By "biodegradable" it is meant a material capable of being decomposed by biological agents, especially bacteria. The term "biodegradable" can also mislead consumers because the process of breaking down the material in a compost pile depends heavily on humidity and temperature. Many plastics that carry this claim will only biodegrade in industrial conditions that reach hot enough temperatures.

By "compostable" it is meant a material that can biodegrade under specific human-driven circumstances. The primary difference between compostable and biodegradable is that compostable materials require a specific setting in order to break down, whereas biodegradable materials break down naturally. Typically, composting is a faster process but only under the right conditions. Compostable plastics are another subset of biodegradable plastics, but while all compostable plastics are biodegradable, not all biodegradable plastics are compostable. These products are generally though by consumers to be compost at home but that is not the case—it requires industrial composting at high temperatures. Most compostable plastics are biobased and are designed to break down within three to six months.

There are many types of biodegradable plastics, but the most common are starch-based polylactic acid (PLA) and polyhydroxyalkanoates (PHA). PLA can "look and behave like polyethylene (used in plastic films, packing, and bottles), polystyrene (plastic foam and plastic cutlery), or polypropylene (packaging, auto parts, textiles)", while PLA is created by microorganisms that produce plastic from carbon-rich organic material and is used in industrial applications, such a making injection-molded auto parts.

By "oxodegradable" it is meant a conventional petroleum-based plastic which includes one or more additives that help the plastic break down faster. Oxodegradable plastics are a subset of biodegradable plastics.

The term "non-woven" is applied to a wide range of products which, in terms of their properties, are located between those of paper and cardboard on the one hand, and textiles on the other hand. As regards non-woven, a large number of extremely varied production processes are used, such as the air-laid and spun-laced techniques, as well as wet-laid techniques. A non-woven includes mats, non-woven fabrics and finished products made thereof. A non-woven may also be called a textile-like composite material. A textile-like composite material can have flexible porous fabrics that are not produced by the classic methods of weaving warp and weft or by looping. In fact, a non-woven can be produced by intertwining fibers, or by bonding fibers by using a cohesive or an adhesive, or a combination thereof. The non-woven can be formed of natural fibers, such as cellulose or cotton fibers, or can consist of synthetic fibers, such as polyethylene (PE), polypropylene (PP), polyurethane (PU), polyester, nylon or regenerated cellulose, or a mix of different fibers. The fibers may, for example, be present in the form of endless fibers of pre-fabricated fibers of a finite length, as synthetic fibers produced in situ, or be in the form of staple fibers. A non-woven may consist of mixtures of synthetic and cellulose fibrous material, e.g. natural vegetable fibers.

The fibrous web may be converted to the final hygiene or wiping product in many ways, for example, by embossing and/or laminating it into a multi-layered product, rolled or folded.

Hygiene or wiping products primarily include all kinds of dry-creped tissue paper, wet-crepe paper, Through Air Drying (TAD) paper, and cellulose or pulp-wadding or all kinds of non-wovens or combinations, laminates or mixtures thereof. Typical properties of these hygiene and wiping products include the reliability to absorb tensile stress energy, their drapability, good textile-like flexibility, properties which are frequently referred to as bulk softness, a higher surface softness, and a high specific volume with a perceptible thickness. A liquid absorbency as high as possible and, depending on the application, a suitable wet and dry strength, as well as, an appealable visual appearance of the outer product's surface are desired. These properties, among others, allow these hygiene and wiping products to be used, for example, as cleaning wipes, such as paper or non-woven wipes, windscreen cleaning wipes, industrial wipes, kitchen towels and the like; as sanitary products, such as, for example, bathroom towels, paper or non-woven handkerchiefs, household towels, paper towels and the like; as cosmetic wipes, such as, for example, facials and as serviettes or paper napkins, just to mention some of the products that can be used. Furthermore, the hygiene and wiping products can be dry, moist, wet, printed or pretreated in any manner. In addition, the hygiene and wiping products may be folded, interleaved or individually placed, stacked or rolled, connected or not, in any suitable manner.

It should be understood, that the above described products can be used for personal and household use, as well as, commercial and industrial use. The multi-layered product 10 can absorb fluids, remove dust, be used for decorative purposes, be used as supporting material, as is common, for example, in medical practices or in hospitals. The multi-layered product 10 can also be used for non-absorption uses, such as to create a package or envelope.

Referring now to FIGS. 1 and 4, the third layer 20 is embossed into a waffle pattern. By "embossing" it is meant to mold or carve in relief. The waffle pattern is present on both the first and the second surfaces, 22 and 24 respectively, of the third layer 20. By "waffle pattern" it is meant a pattern resembling a battercake baked on a waffle iron. The waffle pattern includes a plurality of protrusions 26, 26 and a plurality of recesses 28, 28. Each of the plurality of protrusions 26 and each of the plurality of recesses 28 are adjacently aligned and horizontally offset from one another. By "protrusion:" it is meant something that protrudes. By "recess" it is meant an indentation or small hollow. Each protrusion 26 has an upper outer surface 30 which can vary in geometrical configuration. The upper outer surface 30 can be flat, curved, be convex, be concave, form an apex, a plateau, or have some other geometrical configuration. By "apex" it is meant the highest point. By "plateau" it is meant an elevated, relatively level expanse. Each recess 28 has an upwardly facing surface 32 which can have a nadir or bottom. By "nadir" it is meant the lowest point. The upwardly facing surface 32 can vary in geometrical configuration. The upwardly facing surface 32 can be flat, have a semi-rounded appearance, be curved or have some other geometrical configuration.

It should be evident to one viewing FIG. 1, that each of the protrusions 26, 26 on the first surface of the third layer 20 will be the mirror image of each of the recesses 28, 28 formed on the second surface 24 of the third layer 20. Each of the protrusions 26 formed on the first surface 22 of the third layer 20 will contact the interior surface 14 of the first layer 12. Likewise, each of the protrusions 26 formed on the second surface 24 of the third layer 20 will contact the interior surface 18 of the second layer 16.

Still referring to FIG. 1, the embossed waffle pattern appears on both the first and second surfaces, 22 and 24 respectively, of the third layer 20. The pattern can be circles, squares, rectangles, triangles or some other geometrical configuration which is aesthetically pleasing. The raised area of the waffle pattern to the recesses area can be in a ratio of 50/50, 40/60, 30/70, etc.

The waffle pattern creates opposing surfaces that are easy to bond to. The waffle pattern also creates void volume which contribute to excellent absorbent properties and softness in the multi-layered product 10.

Referring again to FIGS. 1 and 4, the third layer 20 has a plurality of protrusions 26, at the first surface 22, which form a horizontal plane, designated "A". The horizontal plane "A" passes through the upper outer surfaces 30 of each of the plurality of protrusions 26. The third layer 20 has a plurality of recesses, at the first surface 22, which form a horizontal plane, designated "B". The horizontal plane "B" passes through the upwardly facing surfaces 32 of each of the plurality of recesses 28. The horizontal plane "A" is positioned above the horizontal plane "B". The upper outer surfaces 30, 30 of the plurality of protrusions 26, 26 are located vertically above and are offset from the upwardly facing surfaces 32, 32 of the plurality of recesses 28. This distance is designated "d". The distance d can vary in dimension. When the thickness t2 of the third layer 20 ranges from between about 0.75 mils to about 35 mils, the distance d will be less than the thickness t2 of the third layer 20 minus the vertical height of the third layer 22 measured between the first surface 20 and the second surface 24. Desirably, the distance d is at least about 5 mils. More desirably, the distance d is at least about 10 mils. Even more desirably, the distance d is at least about 15 mils. Most desirably, the distance d is less than about 30 mils.

Referring now to FIG. 3, an alternative embodiment for a multi-layered product 10' is shown. This embodiment differs from the embodiment shown in FIG. 1 in that the second layer 16 is depicted as a tissue layer embossed with a predetermined pattern. The pattern can vary. The pattern can be a crepe pattern, a linen pattern or some other pattern. By "crepe" it is meant a light, soft, thin, non-woven fabric with a crinkled surface. By "linen" it is meant a pattern which resembles a woven linen tablecloth or a linen suit. As stated above, almost any desired pattern can be utilized. The second layer 16 can be a single ply, two plies or be multiply, for example, three or more plies. The second layer 16 has a thickness t1. The thickness t1 can vary. A "mil" is 0.001 inches. Normally, the thickness t1 of the second layer 16 can range from between about 0.75 mils to about 30 mils. Desirably, the thickness t1 of the second layer 16 can range from between about 1 mil to about 30 mils. More desirable, the thickness t1 of the second layer 16 can range from between about 5 mils to about 30 mils. Even more desirably, the thickness t1 of the second layer 16 can range from between about 10 mils to about 30 mils. Most desirably, the thickness t1 of the second layer 16 is greater than about 15 mils.

When the second layer 16 is formed from a tissue, the multi-layered product 10" can be used to construct absorbent products, such as industrial wipes, tissue products, paper napkins, etc. One will also notice that the exterior surface of the second layer 16 does not need to be planar. The embossed pattern on the second layer 16 makes the exterior surface non-planar.

Referring now to FIGS. 4-7, several different geometrical shapes are shown for the plurality of protrusions 26 and the plurality of recesses 28 embossed in the third layer 20. In FIG. 4, a square or rectangular profile is depicted. This is a typical waffle pattern. Each of the plurality of protrusions 26 has a flat profile and each of the plurality of recesses 28 also has a flat profile. In FIG. 5, a third layer 20' is shown having a sinusoidal or undulating profile. Each of the plurality of protrusions 26' has a semi-circular profile and each of the plurality of recesses 28' has a semi-circular profile. In FIG. 6, a third layer 20" is shown having a taper profile. Each of the plurality of protrusions 26" has a tapered profile and each of the plurality of recesses 28" has a tapered profile. In FIG. 7, a third layer 20" is shown having a modified taper or "W" profile. In this embodiment, the distance d has a greater dimension than that shown in FIG. 6.

It should be understood that a variety of other geometrical configurations for the embossed pattern can also be utilized to form the third layer 20, 20', 20" or 20'''.

Referring now to FIGS. 8-10, top views of three different geometrical configurations are depicted of the waffle pattern. In FIG. 8, a square configuration for the plurality of protrusions 26 is shown. In FIG. 9, a round or circular configuration for the plurality of protrusion 26s is shown. In FIG. 10, a diamond configuration for the plurality of protrusions 26 is shown.

Referring again to FIGS. 4-7, one will notice that the embossed pattern is continuous from side to side. In addition, none of the plurality of protrusions 26, 26, and none of the plurality of recesses 28, 28 have any small openings or apertures formed therein.

Referring now to FIG. 11, an alternatively embodiment is shown wherein a third layer 21 is shown having at least one aperture 27 formed therein. Desirably, at least one aperture 27 is formed in the upper outer surface 30 of each of the plurality of protrusions 26 and at least one aperture 27 is formed in the upwardly facing surface 32 of each of the plurality of recesses 28. Each aperture 27 will extend through the third layer 20 from the first surface 22 to the second surface 24. When more than three apertures 27 are present, they can be randomly arranged or be arranged in a predetermined pattern. An aperture 27 can be formed through the sidewall and/or through the upper outer surface 30 of a protrusion 26. Likewise, an aperture 27 can be formed through the sidewall and/or through the upwardly facing surface 32 of a recess 28. The positions of the various apertures 27 can vary. The apertures 27 could be formed at an acute or obtuse angle to the first surface 22 or the apertures 27 can be formed perpendicular thereto. The number of apertures 27 that are present in the third layer 21 can vary from one to many. Desirably, a plurality of apertures 27 are formed throughout the entire surface area of the third layer 21. Another option is to form at least one aperture 27 in each of the plurality of protrusions 26 and to form at least one aperture 27 in each of the plurality of recesses 28. The size and shape of the aperture(s) 27 can vary. Generally, the aperture(s) 27 should be relatively small, having a size of 0.01 inches or less. Desirably, the size of the aperture(s) 27 ranges from between about 0.001 inches to about 0.01 inches. The shape of the apertures 27 can be any geometrical shape known to man. All of the apertures 27 formed in the third layer 21 can have the same geometrical shape. Alternatively, one or more of the apertures 27 can vary in geometrical shape from other apertures 27.

It should be understood that the apertures 27 could be formed only in upper outer surface 30 of each of the plurality of protrusions 26 and/or be formed only in the upwardly facing surface 32 of each of the plurality of recesses 28, if so desired. Furthermore, one or more apertures 27 can be formed through one or more of the plurality of protrusions 26 and/or through one or more of the plurality of recesses 28, regardless of the overall shape or configuration of each of the protrusions 26 and recesses 28.

The apertures 27 function to make the multi-layered product 10 more porous and breathable. The apertures 27 could also add to the softness of the multi-layered product 10.

Referring again to FIG. 1, as described above, the third layer 20 has a first surface 22 and a second surface 24. One will clearly see that the first surface 22, at each of the plurality of protrusions 26, 26, is located in a horizontal plane "A" which is positioned above a horizontal plane "B" formed by the plurality of recesses 28, 28, at the first surface 22. In other words, the upwardly facing surface 32 of each of the plurality of recesses 28 is situated in a plane which is below the upper outer surface 30 of each of the plurality of protrusions 26.

Still referring to FIG. 1, the multi-layered product 10 also contains an adhesive 34. The adhesive 34 can vary in composition. The adhesive 34 could be almost any commercially available resin that is strong and flexible and is known by those skilled in the adhesive art for securing a tissue layer to a non-woven material. Examples of some adhesive which could be used include but are not limited to: a self-crosslink acetate/ethylene copolymer resin, an acrylic copolymer resin, a vinyl acetate ethylene resin, etc. A polymer emulsion binder can be used. An adhesive that works well is a vinyl acetate ethylene adhesive, product code VAE 6955. This adhesive is commercially available from Celenese Corporation, having an office at 222 W. Las Collins Blvd, Suite 900 N, Irving, Texas, 75039.

The adhesive 34 should be biodegradable and/or compostable. By a "biodegradable adhesive" it is meant an adhesive that can be fully returned to the earth without being subjected to outside environmental factors. Biodegradable adhesives can be broken down completely naturally by bacteria, fungi or some other biological process that doesn't require anything but time and environment. Sometimes, environmental agents such as: UV radiation, hydrolysis, mineral acid/alkali reaction, erosion, etc. are used shorten the process. Examples of biodegradable adhesives include but are not limited to: cellulosic systems, animal-derived systems and certain types of synthetic systems including some acrylics and cyanoacrylates.

Compostable adhesives are a sub-set of biodegradable adhesives. Compostable adhesives may require a specified process to break down. The process for compostable adhesives to break down may take place in domestic or industrial conditions, depending on the adhesive formulation. Such processes usually employ very high elevated temperatures.

The adhesive 34 is applied to at least a portion of the interior surfaces, 14 and 18 respectively, of the first and second layers, 12 and 16 respectively. Alternatively, the adhesive 34 could be applied to the first and second surfaces, 22 and 24 respectively, of the third layer 20. The adhesive 34 can be sprayed on, be brushed on, be printed on, be applied as a coating, etc. The adhesive 34 can be applied in a pin pattern, in a swirl pattern, in a block pattern or in some other manner known to those skilled in the art. As shown in FIG. 1, the adhesive 34 is applied to the interior surface 14 of the first layer 12 which contacts the protrusions 26. The adhesive 34 is also applied to the interior surface 18 of the second layer 16 and contacts the horizontally adjacent protrusions 26 which face in the opposite direction to those which contact the first layer 12. The adhesive 34 functions to secure the first, second, and third layers 12, 16 and 20 together to form the multi-layered product 10. Some of the adhesive 34 could be applied to a portion of the sidewalls of the protrusions 26 and/or recesses 28 but this is not necessary. The function of the adhesive 34 is to secure the first, second and third layers, 12, 16 and 20 respectively, together.

Alternatively, the adhesive 34 could be applied to the first and second surfaces, 22 and 24 respectively, of the third layer 20, in those areas where the protrusions 26 contact the interior surface 14 of the first layer 12, and in those areas where the protrusions 26 contact the interior surface 18 of the second layer 16. The adhesive 34 will secure the interior surface 14 of the first layer 12 to the first surface 22 of the third layer 20. The adhesive will also secure the interior surface 18 of the second layer 16 to the second surface 24 of the third layer 20.

Referring again to FIGS. 1 and 3, the multi-layered product 10 has an overall thickness t3. The thickness t3 can vary. A "mil" is 0.001 inches. The multi-layered product 10 can be manufactured to have a thickness t3 which can range from between about 5 mils to about 95 mils. Desirably, the thickness t3 of the multi-layered product 10 can range from between about 30 mils to about 95 mils. More desirable, the thickness t3 of the multi-layered product 10 can range from between about 40 mils to about 95 mils. Even more desirably, the thickness t3 of the multi-layered product 10 can range from between about 50 mils to about 95 mils. Most desirably, the thickness t3 of the multi-layered product 10 is greater than about 55 mils.

Lastly, in one specific embodiment, the multi-layered product 10 will have an overall basis weight. The multi-layered product 10 will also have an overall thickness t3 which ranges from between about 5 mils to about 35 mils. The third layer 20 will be formed from a biodegradable, starch-based polylactic acid. In addition, the adhesive 34 will be either biodegradable or compostable and will have a basis weight which ranges from between about 5% to about 35% of the overall basis weight of the multi-layered product 10.

METHOD

A method of forming a multi-layered product 10 is also disclosed. The method includes the steps of forming a first layer 12 from tissue and embossing the first layer 12 with a predetermined pattern. The pattern can vary in design. A crepe pattern or a linen pattern works well. The first layer 12 has an interior surface 14 and a thickness t. The first layer 12 can be constructed as a single ply, as a two ply, or as a multiply structure. A second layer 16 is also formed. The second layer 16 can also be formed from tissue and be embossed with a predetermined pattern. Desirably, the second layer 16 is formed from tissue when the multi-layered product 10 is to be used to form an absorbent product. The embossed pattern on the second layer 16 can be identical to, be similar to, or be different from the embossed pattern formed on the first layer 12. The pattern embossed on the second layer 16 can vary in design. A crepe pattern or a linen pattern works well. The second layer 16 has an interior surface 18 and a thickness t1. When the second layer 16 is formed from tissue, it can be constructed as a single ply, as a two ply, or as a multiply structure. Alternatively, the second layer 16 can be formed of cellulose (paper). Desirably, the second layer 16 is formed from Kraft paper stock when the multi-layered product 10 is to be used to form a package or envelope.

The method also includes forming a third layer 20 from a non-woven material or from a tissue. Desirably, the third layer 20 is formed from a biodegradable material. More desirably, the third layer 20 is formed from a non-woven, biodegradable material. When the third layer 20 is formed from a tissue, it can be constructed as a single ply, as a two ply, or as a multiply structure. The third layer 20 has a first surface 22, a second surface 24, and has a thickness t2 therebetween. The thickness t2 of the third layer 20 can be greater than the thickness t of either the first tissue layer 12 or be greater than the thickness t1 second layer 16. Desirably, the thickness t2 of the third layer 20 is greater than the thickness of both the first layer 12 and the second layer 16. The third layer 20 has a basis weight ranging from between about 3 pounds to about 24 pounds. Desirably, the basis weight of the third layer 20 is greater than about 5 pounds. More desirably, the basis weight of the third layer 20 is greater than about 10 pounds. Even more desirably, the basis weight of the third layer 20 is greater than about 15 pounds. Most desirably, the basis weight of the third layer 20 ranges from between about 5 pounds to about 20 pounds.

The third layer 20 is embossed into a waffle pattern having a plurality of protrusions 26, 26 and a plurality of recesses 28, 28. Each of the plurality of protrusions 26, 26 and each of the plurality of recesses 28, 28 is adjacently aligned and horizontally offset from one another. When the third layer 20 is embossed into a waffle pattern, the plurality of protrusions 26, 26 form a horizontal plane, designated "A" in FIG. 4, at the first surface 22. The plurality of recesses 28, 28 form a horizontal plane, designated "B" in FIG. 4, at the first surface 22. The horizontal plane "A" is positioned above a horizontal plane "B."

The method further includes using an adhesive 34 to secure at least a portion of the interior surfaces 14 and 18 of the first and second layers, 12 and 16 respectively, to the third layer 20. The interior surface 14 of the first layer 12 is secured to the first surface 22 of the third layer 20 and the interior surface 18 of the second layer 16 is secured to the second surface 24 of the third layer 20. The first layer 12, the second layer 16 and the third layer 20 are then routed through a nip to secure the three layers together. The pressure exerted by the nip compresses the three layers 12, 16 and 20 and forms the multi-layered product 10.

Alternatively, heat and pressure can both be applied at the nip, if desired.

The multi-layered product 10 can then be cured in a dryer after the three layers 12, 16 and 20 have passed through the nip. The amount of time spent in the dryer will depend on the type of adhesive 34 that is used, the amount of adhesive that is present, the material from which each of the three layers 12, 16 and 20 are constructed, etc.

The method of forming a multi-layered product 10 can also include forming the first layer 12 to have a thickness t of less than about 10 mils and to have a basis weight ranging from between about 3 pounds to about 24 pounds. The method also includes forming a second layer 16 from cellulose (paper) to have a thickness t1 of less than about 15 mils and to have a basis weight ranging from between about 30 to about 60 pounds per ream. The method further includes forming a third layer 20 to have a thickness t2 and a basis weight ranging from between about 3 pounds to about 24 pounds. The thickness t2 of the third layer 20 will be greater than the thickness t of the first layer 12 or the thickness t1 of the second layer 16.

While the invention has been described in conjunction with several specific embodiments, it is to be understood that many alternatives, modifications, and variations will be apparent to those skilled in the art in light of the foregoing description. Accordingly, this invention is intended to embrace all such alternatives, modifications and variations which fall within the spirit and scope of the appended claims.

What is claimed is:

1. A method of forming a multi-layered product, comprising:
    forming a first layer from tissue and embossing the first layer with a crepe pattern, wherein the first tissue layer has an interior surface, a first thickness of greater than 0 mils and less than about 10 mils, and a basis weight from between about 3 pounds to about 24 pounds per ream;
    forming a second layer, wherein:
        the second layer has an interior surface; and
        the second layer has a second thickness of greater than 0 mils and less than about 15 mils, and a basis weight from between about 30 to about 60 pounds per ream;
    forming a third layer from a non-woven biodegradable material, wherein the third layer has a first surface, a second surface, a basis weight from between about 3 pounds to about 24 pounds per ream, and a third thickness between the first surface and the second surface, the third thickness being greater than the thickness of either the first layer or the second layer;
    embossing the third layer into a waffle pattern having a plurality of protrusions and a plurality of recesses, wherein:
        each of the plurality of protrusions is adjacently aligned and horizontally offset from one another;
        each of the plurality of protrusions formed in the third layer has a flat profile on the first and second surfaces;
        each of the plurality of recesses formed in the third layer has a flat profile on the first and second surfaces;
        the plurality of protrusions form a horizontal plane at the first surface, wherein the horizontal plane is positioned above a horizontal plane formed by the plurality of recesses at the first surface;
    using a compostable adhesive to secure a portion of the interior surfaces of the first layer and the second layer to the first and second surfaces of the third layer, respectively; and routing the first, second, and third layers through a nip to secure the first, second, and third layers together.

2. The method of claim 1, further comprising curing the multi-layered product in a dryer after the first, second, and third layers are routed through the nip.

3. The method of claim 1, further comprising applying heat and pressure at the nip.

4. The method of claim 1, further comprising embossing the first layer with a linen pattern.

5. The method of claim 1, further comprising embossing the second layer with a pattern.

6. The method of claim 5, wherein the second layer is embossed with a crepe pattern.

7. The method of claim 5, wherein the second layer is embossed with a linen pattern.

8. The method of claim 1, wherein the second layer is formed from tissue.

9. The method of claim 1, wherein the second layer is formed from cellulose.

10. A method of forming a multi-layered product, comprising:
    forming a first layer from tissue and embossing the first layer with a crepe pattern, wherein the first tissue layer has an interior surface, a first thickness of greater than 0 mils and less than about 10 mils, and a basis weight from between about 3 pounds to about 24 pounds per ream;
    forming a second layer, wherein:
        the second layer has an interior surface; and
        the second layer has a second thickness of greater than 0 mils and less than about 15 mils, and a basis weight from between about 30 to about 60 pounds per ream;
    forming a third layer from a non-woven biodegradable material, wherein the third layer has a first surface, a second surface, a basis weight from between about 3 pounds to about 24 pounds per ream, and a third thickness between the first surface and the second surface, the third thickness being greater than the thickness of either the first layer or the second layer;
    embossing the third layer into a waffle pattern having a plurality of protrusions and a plurality of recesses, wherein:
    each of the plurality of protrusions is adjacently aligned and horizontally offset from one another;
        each of the plurality of protrusions formed in the third layer has a flat profile on the first and second surfaces;
        each of the plurality of recesses formed in the third layer has a flat profile on the first and second surfaces;
    the plurality of protrusions form a horizontal plane at the first surface, wherein the horizontal plane is positioned above a horizontal plane formed by the plurality of recesses at the first surface;
    forming a plurality of apertures in the third layer;
    using a compostable adhesive to secure a portion of the interior surfaces of the first layer and the second layer to the first and second surfaces of the third layer, respectively; and
    routing the first, second, and third layers through a nip to secure the first, second, and third layers together.

11. The method of claim 10, wherein forming a plurality of apertures in the third layer further comprises forming a plurality of apertures in an upwardly facing surface of the plurality of recesses.

12. The method of claim 10, wherein forming a plurality of apertures in the third layer is formed through an entire surface area of the third layer.

13. The method of claim 10, wherein the plurality of apertures extends through the third layer.

14. The method of claim 10, wherein the plurality of apertures are formed through a portion of the plurality of protrusions.

15. The method of claim 10, wherein forming a first layer from tissue further comprises forming a first layer having two plies.

* * * * *